United States Patent
Barker et al.

[15] 3,653,824
[45] Apr. 4, 1972

[54] OXIDATIVE REGENERATION METHOD

[72] Inventors: Richard G. Barker, Princeton Junction, N.J.; James L. Ma, Los Angeles, Calif.

[73] Assignee: Union Camp Corporation, New York, N.Y.

[22] Filed: Oct. 16, 1969

[21] Appl. No.: 867,057

[52] U.S. Cl. ............................................................. 23/145
[51] Int. Cl. ......................................................... C01g 45/02
[58] Field of Search ..................................... 23/145, 135, 285

[56] References Cited

UNITED STATES PATENTS 3,418,237  12/1968  Booth et al. ............................. 23/134
3,470,061  7/1969  Barker ..................................... 23/134

OTHER PUBLICATIONS

Chemical Engineering, Jan. 1954, Vol. 61, p. 372– 375

Primary Examiner—Oscar R. Vertiz
Assistant Examiner—Hoke S. Miller
Attorney—Kane, Dalsimer, Kane, Sullivan and Kurucz

[57] ABSTRACT

Process and apparatus for recovering and regenerating spent manganese oxidant in an aqueous stream by concentrating the spent oxidant to produce a thickened slurry, forming a charge of free-flowing granular particles from the slurry and oxidizing the charge. The stream may be thickened by employing a settling tank, formed into a charge in a solids mixer, and oxidized in a regeneration dryer.

11 Claims, 1 Drawing Figure

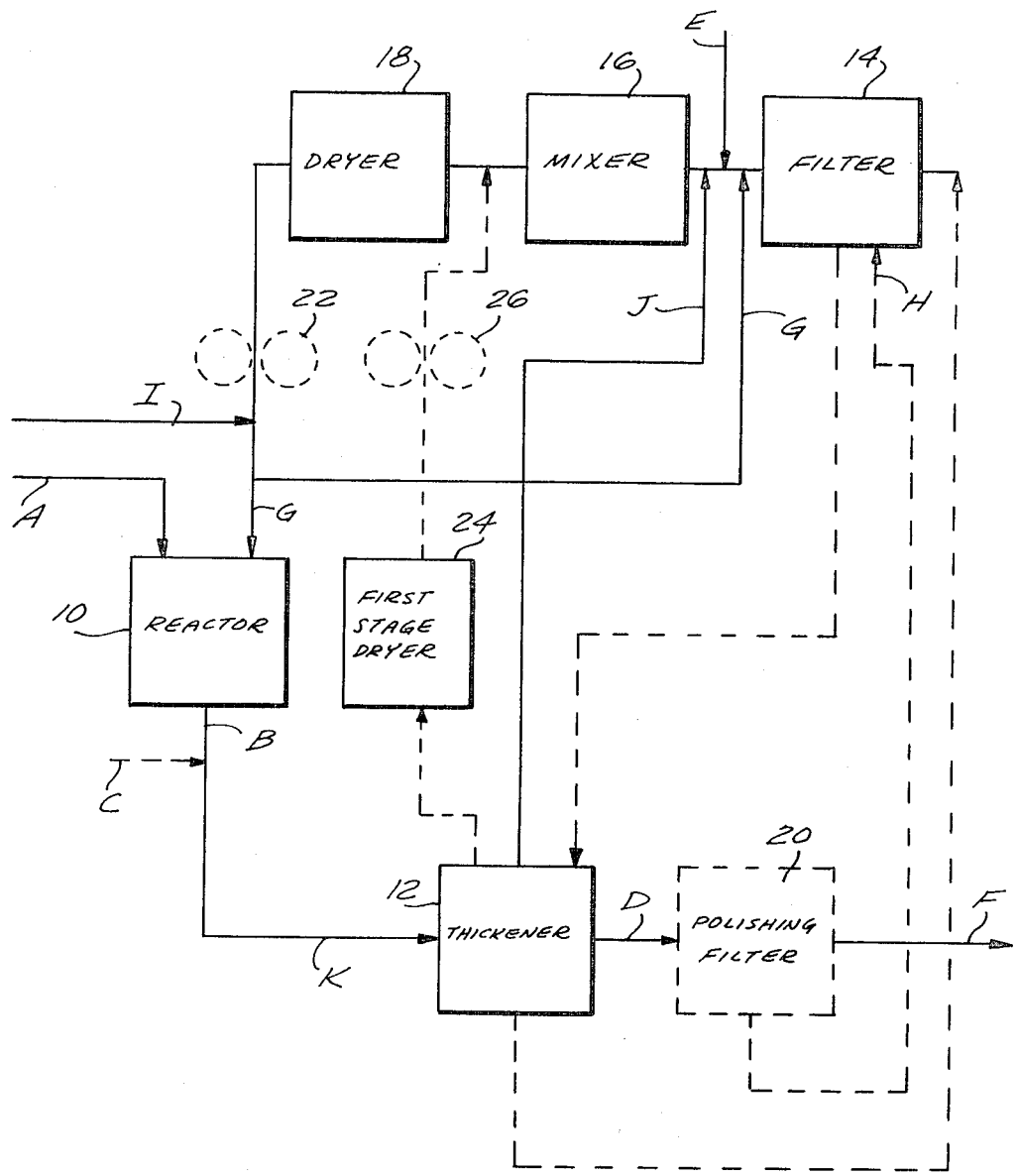

OXIDATIVE REGENERATION METHOD

BACKGROUND OF THE INVENTION

The term manganese oxidant, as employed herein, is defined as a mixture of a major portion of manganese oxides wherein the manganese is in higher oxidation states and greater than 2 and usually such higher manganese oxides as $MnO_2$, $MnOOH$, $Mn_3O_4$, $Mn_2O_3$ and a minor portion of manganese oxides wherein the manganese is in lower oxidation states and no greater than 2 and including a substantial portion of manganous oxide.

Spent manganese oxidant is defined as a mixture of a major portion of manganese oxides, wherein the manganese is in lower oxidation states and no greater than 2 and including a substantial portion of manganous oxide, and a minor portion of manganese oxides, wherein the manganese is in higher oxidation states and greater than 2 and generally $MnO_2$, $MnOOH$, $Mn_3O_4$, and $Mn_2O_3$.

The invention relates to a process and apparatus for recovering and regenerating spent manganese oxidant discharged from an oxidizer. In particular, it relates to a process and apparatus for producing more uniform size controlled manganese oxidant particles from spent manganese oxidant discharged from a reactor in which sulfides, present in an alkaline pulping liquor system are converted to polysulfide sulfur.

In Barker U.S. Pat. No. 3,470,061, a process is disclosed for generating sodium polysulfide sulfur from sodium sulfide pulping liquors by employing an insoluble, oxidizing manganese compound. The teachings of the Barker patent are expressly incorporated by reference into the present application. The Barker patent discloses that spent manganese oxidant may be regenerated and recycled for further oxidation of additional sulfide.

During the continuous recycling of manganese oxidant in the aforesaid process, certain quantities of fines and lumps of manganese oxidant and spent manganese oxidant are produced. Fines are not as susceptible to recovery procedures as larger oxidant particles. Lumpy granules tend to interfere with the free flow of effluent streams in the pipes and outlets of a recovery and regeneration system. Generally, larger particles of oxidant require additional agitation in the reactor in order to ensure complete commingling with the reactor slurry containing sulfides.

SUMMARY OF THE INVENTION

It is, therefore, a primary object of this invention to provide an improved process and apparatus for oxidatively regenerating spent manganese oxidant, particularly in an alkaline pulping liquor-sulfide oxidation process. It is another object of this invention to provide a more balanced size distribution of manganese oxidant particle than has been heretofore liquor oxidation of sulfide to polysulfide sulfur.

The above and other objects are met by concentrating the product stream discharged from a reactor, wherein manganese oxidant is employed for oxidation purposes and is reduced to lower manganese oxides, to produce a thickened aqueous slurry of spent manganese oxidant. In general the slurry contains about 40 percent solids on a weight basis. An effluent product stream produced by the concentrating step is separated from the slurry. A settling tank may be employed for this purpose.

The thickened slurry is formed into a granular charge of free-flowing particles. The moisture content of the particles should be less than 30 percent and preferably less than 20 percent by weight, based on total particle weight. Should the moisture content of the particles be significantly greater than the aforesaid, then an undesirable thixotropic mix may be formed. Such a mix cannot be properly regenerated according to the invention. A free-flowing charge may be formed by combining the thickened slurry with dry material, such as fresh or regenerated manganese oxidant in a solids mixer.

The charge is thereafter oxidized to higher manganese oxides. It is preferred to oxidize under conditions sufficient to heat the charge to a surface temperature of at least about 200° F. Rotary kiln dryers are particularly suited for this purpose.

Heretofore, the fresh, initial oxidant charge of uniform particle size prepared by conventional techniques had deteriorated and broken down during continuous processing. It is an important feature of the invention that the regenerated oxidant is maintained in a more balanced and uniform particle size distribution.

DESCRIPTION OF THE PREFERRED EMBODIMENTS

Although applicable to other processes employing manganese oxidant the invention is preferably employed in a conventional alkaline pulping liquor system, and most preferably in a kraft liquor pulping process. Typically, manganese oxidant is employed to convert sulfides in kraft pulping liquor to polysulfide sulfur.

This reaction is carried out in a well-stirred reactor, employing kraft liquor. Reactants are agitated in the reactor to keep the oxidant in good contact with the white liquor. The degree of agitation required for particle suspension is dependent, in part, on the particle size of the oxidant. As the size of the oxidant particles in the reactor increases, a greater degree of agitation is required to keep the particles in suspension.

Generally, the rate of manganese oxidant addition is adjusted close to the stoichiometric requirement of 1 mole of manganese dioxide for each mole of sodium sulfide in the white liquor. The concentration of oxidant may be up to 60 percent by weight, but is preferably from 5 to 20 percent by weight, based on the total weight of the mix. The reaction is generally carried out in less than about 2 hours and preferably in from about 15 to 45 minutes, although, depending on the temperature employed and degree of agitation of the mixture, the reaction may be carried out for up to about 8 hours.

The temperature of the reaction mix may be from about 70° to 300° F. At temperatures above the boiling point of the mixture, pressure must be applied to the mix to prevent undesirable, uncontrolled boiling. This may be accomplished simply by employing a closed reaction vessel. The preferred reaction temperature is from about 160° to 190° F. For present purposes, the pH of the mix is preferably alkaline.

The degree of sulfidity of the mix is at least about 15 percent and is preferably at least about 25 percent.

The product stream discharged from the reactor contains typically, polysulfide sulfur, a strong inorganic base, spent manganese oxidant, and water, among other constituents.

To recover and regenerate the spent manganese oxidant in this stream, the spent oxidant is first concentrated and separated from the polysulfide sulfur and other dissolved or liquid constituents. This may be accomplished by performing one or more of the following steps and/or combinations thereof: flocculating, settling, centrifuging, wet cycloning and the like. In general, it is preferred to form a thickened aqueous slurry of spent oxidant having a solids concentration of from about 40 to 60 percent by weight, based on the total slurry weight.

In one embodiment, the product discharge stream is concentrated to a slurry having about 40 percent by weight spent oxidant solids. A settling tank, centrifuge and the like, and/or flocculants may be employed for this purpose. The overflow effluent is separated by conventional techniques. The thickened slurry is then partially dried employing conventional dryers to a solids content of at least about 70 percent and preferably 80 percent by weight. The partially dried mass is then crushed to form a free-flowing granular charge, which is treated according to the invention herein disclosed. A roll crusher may be utilized for this operation.

In a second and more preferred embodiment, the reactor discharge stream is concentrated to 40 percent by weight solids content and more preferably from 40 to 60 percent solids by weight, and the liquid effluent is separated as set forth heretofore. This step may also be effected by adding flocculant to the stream and thereafter settling the stream in a tank equipped with a compacting rake. The thickened slurry of spent oxidant is introduced into a solids mixer for conversion into a free-flowing granular charge by means described below.

In a third and most preferred embodiment, the effluent stream is initially flocculated employing mechanical and/or chemical flocculation techniques. Enhanced results are obtained, however, when a flocculating agent is introduced into the reactor discharge stream near the discharge end of the reactor and the flocculated effluent stream is thereafter settled to produce a thickened aqueous slurry of spent manganese oxidant.

The flocculating agent employed must be stable in the basic (caustic) effluent stream. Suitable agents include anionic and non-ionic flocculants. The flocculants may be organic or inorganic. Typical non-ionic flocculating agents include: polyethylene glycols, polyvinyl alcohols, polyethers, and polyesters. Examples of typical non-ionic flocculants include: polyoxyalkylene derivatives of sorbitan monooleate, sorbitan trioleate, sorbitan monostearate, sorbitan palmitate, sorbitan monolaurate, and sorbitan oleate, and polyethylene glycol distearate. Preferred non-ionic flocculants include polyacrylamides having molecular weights of from about 1 million to 6 million. Particularly preferred flocculants are Dow Chemical NP-20, a non-ionic polyacrylamide with a molecular weight in excess of 1 million, Dow Chemical MGL, a non-ionic polyacrylamide with a molecular weight of about 1 million and Standard Brands-Tylac a non-ionic polyacrylamide with a molecular weight of about 6 million.

Typical anionic flocculants include carboxylates, as sodium oleate and sodium palmitate, sulfates and sulfonates, particularly metal alkaryl sulfonates. Especially preferred anionic flocculating agents include sodium polystyrene sulfonate and causticized starch. Causticized starch may be prepared by mixing one-half part cornstarch and one-half part sodium hydroxide pellets per 100 parts of water.

Generally, in the case of non-ionic flocculants, and, particularly for the preferred polyacrylamides, 30 to 60 ppm flocculant is employed in the discharge stream from the reactor, based on the total solids content of the stream. The flocculants are preferably added to the effluent stream as a dilute aqueous solution. The preferred concentration of flocculant in said solution is from about 0.05 to 0.10 percent by weight, based on the total weight of the solution.

In the case of the anionic flocculants, sufficient quantities are employed to allow a residence time of no longer than about 2 hours when employing a suitable settling tank. When causticized starch is employed, up to 2,000 ppm can be added. Enhanced results are obtained when from about 200 to 1,500 ppm are employed.

The flocculated effluent stream is thereafter preferably treated by settling in a settling tank. The tank is preferably provided with a means for compacting the particles which collect at the bottom of the tank. A compacting rake is suitably employed. A concentrated slurry which forms at the bottom of the settling tank is generally from about 30 to 60 percent solids, as compared to the 5 to 20 percent solids normally found in an unflocculated effluent stream. Depending on the particular flocculants employed and the efficiency of the settling tank, among other factors, an effluent stream discharged from the settling tank may contain anywhere from about less than 30 to greater than about 200 ppm solids.

It is preferred that the residence time of the non-ionic flocculated effluent stream in the settling tank be at least about 2 hours. If desired, one may heat the reaction slurry within the settling tank in order to induce more rapid settling. However, much care should be taken in order to avoid producing a thermal gradient therein, which would tend to inhibit settling.

In order to further reduce the solids content of the effluent stream discharged from the settling tank, various filters may be employed. It is preferred to employ a polishing filter. If the solids content of the effluent stream from the settler is less than about 50 ppm, the polishing filter need not be employed. The spent oxidant cake built up in such a filter may be back flushed and returned to either the settling tank or to the reactor wherein sulfides are oxidized to polysulfide or to any other convenient point in the process.

It is particularly preferred to form a charge of free-flowing granular particles from the concentrated slurry of the settler, said particles having a moisture content of less than about 20 percent, by employing in combination, a vacuum belt filter and a solids mixer. The thickened slurry, containing from about 40 to 60 percent solids is transported from the settler to the vacuum filter wherein a cake containing at least about 60 percent by weight solids is produced. If the filter cake has less than about 60 percent by weight solids, the cake will tend to stick to the belt.

It is particularly preferred to employ a top-loading horizontal vacuum belt filter utilizing a vacuum from about 10 to 20 inches of mercury. If a higher vacuum is employed, there is a danger of flashing the filtrate. It is preferable to wash the belt filter cloth between removal of the cake and additional filtration in order to prevent the product from blinding the filter cloth. The washing material may be the product stream from the polishing filter or the white liquor from the inlet feed.

A thickened slurry or filter cake of spent oxidant, generally thixotropic in nature, may be converted to a free-flowing granular charge by adding substantially dry manganese oxide particles thereto and combining said dry particles with said cake in a solids mixer. Generally, it is preferred to employ regenerated manganese oxidant having a moisture content below about 5 percent by weight for this purpose. In addition, fresh manganese dioxide particles may also be employed in order to replace oxidant lost in the process, if any. However, the fresh manganese dioxide particles may be added at other points in the recovery and regeneration process. From 3 to 1 parts dry solids per part wet solids are used.

After the dried manganese oxide solids are added to the thixotropic mass, it is passed through a sigma mixer, or, more preferably, a double-shafted pug mill mixer to produce a free-flowing granular charge.

This charge should preferably have a moisture content of less than about 30 percent by weight and, most preferably, less than about 20 percent by weight in order to expedite proper and efficient regeneration. If the charge is too moist prior to regeneration, it forms hard lumpy aggregates during regeneration. These aggregates tend to oxidize slowly and unevenly, thus reducing the efficiency of the invention. Generally, the charge for the regenerator contains about 25 percent by weight manganese dioxide (employing conventional oxalate analysis) and based on total solids, as supplied, primarily by regenerated add-back manganese oxidant and any fresh makeup manganese dioxide added to make up system loses.

Next, the charge is oxidized. Generally, a regeneration dryer is employed. The temperatures in the dryer should be sufficient to reduce the moisture content of the granules to less than about 30 percent by weight and more preferably to less than about 10 percent by weight. Below about 10 percent by weight moisture, the surface temperature of the particles tends to rise especially rapidly during heating, thereby expediting oxidation.

Generally, a stoichiometric excess of oxygen is present within the dryer in order to convert the charge to a sufficiently regenerated manganese oxidant. Suitable gases for this purpose include oxygen and oxygeneous gases, containing from 5 to 100 percent oxygen. For most purposes, gases, and particularly air, employed in the dryer contain from about 15 to 21 percent by volume oxygen. Regeneration of the particles preferably takes place in the presence of a strong base, preferably sodium hydroxide. The base may be added after the product stream is discharged from the reactor, if desired.

The temperature of the gases within the dryer is maintained at from about ambient temperature to about 1,500° F. A preferred workable temperature range for the gas is from about 160° to 600° F.

Various conventional dryers such as batch and continuous dryers, for example, fluidized bed dryers, rotary dryers, and tunnel dryers are utilized. It is normally preferred to employ a rotary kiln regeneration dryer having a top feeder. In the dryer the flow of heated oxidizing gas is preferably directed countercurrent to the manganese oxidant in order to avoid dusting problems. The residence time for the charge in the regeneration dryer is from about ¼ to 1 hour.

By employing the previously stated air temperatures and residence time, a regenerated manganese oxidant is obtained, having from about 30 to 45 percent by weight manganese dioxide based on oxalate analysis. Higher concentrations of manganese dioxide are obtained by employing longer residence times and/or employing higher concentrations of fresh manganese dioxide particles in the charge conveyed into the regeneration dryer. The regenerated manganese oxidant particles obtained on continuous recycling are of more balanced and optimum particle size distribution than produced heretofore. A substantial portion of the particles, and usually over 50 percent are greater than about 325 mesh. Such particle size control reduces the amount of fines which can be lost to the product stream.

To insure that unduly large manganese oxidant particles are not introduced into the reactor, a roll crusher is optionally employed. The roll crusher breaks up a portion of the large particles and over about 100 mesh in size, if formed, from the dryer. For this purpose, the rolls of the crusher are aligned less than about three-eighths of an inch apart and preferably about one-eighth of an inch apart. Steel rolls are suitable for this purpose.

The further improved recovery and regeneration process of the present invention achieves greater recoveries of spent manganese oxidant from the effluent stream of the reactor than heretofore obtained. The filtration requirements of the polysulfide sulfur stream discharged from the reactor is reduced to a point not achieved heretofore. Stronger and more uniform manganese oxidant particles are regenerated which resist the disintegrating forces present in the overall system.

BRIEF DESCRIPTION OF THE DRAWING

The accompanying drawing depicts a flow sheet illustrating preferred embodiments of the invention.

Referring now to the flow sheet, an alkaline pulping liquor stream containing sulfides A is introduced into reactor 10 wherein the sulfides are oxidized to polysulfide sulfur by manganese oxidant. Product stream B containing spent oxidant is discharged from the reactor. Flocculant may be added to such stream, as shown at C.

The stream is introduced into a thickener 12 wherein a concentrated slurry of spent manganese oxidant and an effluent stream D containing polysulfide sulfur, among other constituents, is produced. The concentrated slurry is discharged from the thickener and may be introduced onto a vacuum belt filter 14. The settling tank effluent is introduced into a polishing filter 20.

The effluent discharge from the polishing filter is circulated to conventional alkaline pulping liquor processing system F. A portion of this effluent H is employed to wash the vacuum belt filter to prevent blinding thereof.

To the filter cake discharge from vacuum filter 14 there is added fresh manganese dioxide E and regenerated manganese oxidant G. The mixture is thereafter introduced into solids mixer 16 for conversion into a free-flowing granular charge. The charge is conducted from the solids mixer 16 to a regeneration dryer 18. After a regenerated manganese oxidant charge has been formed in dryer 18, it is thereafter discharged and passed between rolls 22 of a roll crusher.

As illustrated in the drawing, fresh manganese dioxide may be added to the oxidant stream at any convenient place in the system. As illustrated, the manganese dioxide could be added at point I after the roll crushers 22 rather than at point E, after filter 14.

If desired, white pulping liquor may be employed in conjunction with or in place of effluent H for washing the vacuum belt filter.

In another embodiment of the invention, the thickened slurry is conducted to a first stage dryer 24 wherein the slurry is partially dried. From dryer 24 the partially dried oxidant is conducted through the rolls of crusher 26 to form a free-flowing granular charge. From the crusher the charge is introduced into dryer 18.

In a third embodiment, the thickened slurry J is admixed with fresh manganese oxidant E and regenerated manganese oxidant G and conducted to solids mixer 16 for conversion into a free-flowing charge.

Although the pulping liquor introduced into the reactor may contain a strong base, such base may also be added at a convenient point in the recovery and regeneration process, for example at K.

The following examples are given to illustrate the invention and are not limitative of scope.

EXAMPLE I

In the following two continuous runs, kraft white liquor containing alkali was introduced into a stirred reactor tank along with manganese oxidant. The reactor product stream containing spent oxidant was discharged and mixed with a flocculating agent. Thereafter the stream was settled in a thickener-clarifier tank. The effluent was introduced into a polishing filter. The thickened slurry produced in the thickener was conducted to a vacuum filter extractor having a belt conveyor and was washed with polishing filter effluent liquor. The filter cake continuously produced was introduced into a pug mill solids mixer and regenerated oxidant was added thereto.

The free-flowing charge from the solids mixer was fed into a tunnel dryer employing air for regeneration. From the dryer, the regenerated oxidant was passed between the rolls of a roll crusher. The solids discharged from each of the apparatus employed herein were sampled and analyzed and are reported below:

The following table illustrates the parameters employed at the various stages of the aforesaid process:

| | Run 1 | Run 2 |
| --- | --- | --- |
| 1. REACTOR | | |
| Agitator speed, in RPM | 226 | 226 |
| White Liquor in: | | |
| a. Rate of introduction, gallons per minute | 1.0 | 1.0 |
| b. Sulfidity, % | 27.0 | 24.7 |
| Oxidant addition rate, pounds per minute | 1.22 | 1.63 |
| Temperature, °F. | 175 | 175 |
| Residence time of batch in reactor, hrs. | 2.0 | 2.0 |
| Sodium Sulfide in grams/liter | 35.5 | 32.0 |
| 2. REACTOR OXIDATION PRODUCTS DISCHARGE STREAM | | |
| Solids Concentration, % wt. | 12.0 | 16.0 |
| Polysulfide, grams/liter | 7.5 | 7.0 |
| Sodium Sulfide, grams/liter | 15.1 | 11.5 |
| Flocculant added | polyacrylamide | sodium polystyrene sulfonate |
| Concentration of flocculant in water prior to addition, % wt. | 0.05 | 0.05 |
| Dosage level flocculant in Product Stream, PPM | 30 | 60 |
| 3. THICKENER-CLARIFIER | | |
| Residence Time therein, hrs. | 4.3 | 4.3 |
| Compacting Rake Speed, rpm. | 3.5 | 3.5 |
| Solids in underflow (slurry) % wt. | 30 | 36 |
| Solids in overflow (effluent) ppm | 64.0 | 35.2 |
| 4. POLISHING FILTER | | |
| Oxidant particles in polished product liquor, ppm | 2.9 | 2.9 |
| 5. VACUUM FILTER-EXTRACTOR | | |
| Solids in Filter Cake formed, % by weight | 76 | 75 |

| | | |
|---|---|---|
| Vacuum, in inches mercury | 15 | 15 |
| Manganese Dioxide in Cake, % by wt. | 17.4 | 17.2 |
| 6. SOLIDS MIXER | | |
| Solids added to filter cake, % solids in add-back by wt. | 90.0 | 97.4 |
| Solids in free-flowing charge produced, % by wt. | 83.5 | 87 |
| Ratio of added solids to cake solids | 1.36 | 1.1 |
| 7. TUNNEL DRYER | | |
| Air temperature, °F. | 320 | 320 |
| Air Rate, Cu. Ft./min. | 400 | 400 |
| Residence Time of charge in dryer, min. | 30 | 30 |
| Manganese Dioxide at exit, dryer, % by wt. | 36.4 | 33.5 |
| Solids in charge, after regeneration, % wt. | 95.2 | 93.0 |
| 8. ROLL CRUSHER | | |
| Roll gap, inches | 0.090 | 0.112 |

The above table illustrates the effectiveness of the invention. The concentration of manganese dioxide in the spent oxidant is 17.4 percent as analyzed by the direct oxalate method (see run 1 at vacuum filter). The concentration of manganese dioxide in the regenerated oxidant is 36.4 percent as analyzed the direct method followed after thorough washing in oxygen-free atmosphere is given in "Standard Methods of Analysis," 6th Ed., N. H. Furman editor, Vol. 1, p. 778, (see run 1 at tunnel dryer).

The following table illustrates the change in particle distribution of spent oxidant as it flows through the inventive system from the reactor product stream and through the roll crusher prior to introduction into the reactor. The table shows the weight percentage of particles over 100 mesh, between 100 and 325 mesh, and less than 25 mesh in size in the oxidant for two runs at various points in the process.

SIZE DISTRIBUTION OF PARTICLES

| | >100 Mesh | 100>>325 | <325 Mesh |
|---|---|---|---|
| Product Stream | Run 1 | Run 1 | Run 1 |
| From Reactor | 7.2 | 15.3 | 77.5 |
| (wt. % of particles) | Run 2 | Run 2 | Run 2 |
| | 2.8 | 29.5 | 67.7 |
| Discharge From | Run 1 | Run 1 | Run 1 |
| Thickener | 7.2 | 35.6 | 58.2 |
| | Run 2 | Run 2 | Run 2 |
| | — | — | — |
| Discharge From | Run 1 | Run 1 | Run 1 |
| Polish Filter | 0 | 11 | 89 |
| | Run 2 | Run 2 | Run 2 |
| | 0 | 8 | 92 |
| Discharge From | Run 1 | Run 1 | Run 1 |
| Solids Mixer | 23.1 | 16.2 | 60.7 |
| | Run 2 | Run 2 | Run 2 |
| | — | — | — |
| Discharge From | Run 1 | Run 1 | Run 1 |
| Dryer | 55.2 | 18.3 | 26.5 |
| | Run 2 | Run 2 | Run 2 |
| | 26.8 | 40.3 | 32.9 |
| Roll Crusher | Run 1 | Run 1 | Run 1 |
| | 27.4 | 27.6 | 44.7 |
| | Run 2 | Run 2 | Run 2 |
| | 18.0 | 45.3 | 36.7 |

The size distribution of particles of oxidant is markedly altered by the invention. In run 1, for example 77.5 percent of the particles from the reactor were less than 325 mesh. After regeneration, only 44.7 percent of the particles were less than 325 mesh. Also, only 22.5 percent of the particles from the reactor were greater than 325 mesh, as contrasted to the 55 percent greater than 325 mesh discharged from the roll crusher after regeneration.

From the runs illustrated above, it is seen that the regeneration process provides greater than 100 percent increase in available manganese dioxide as compared to the spent oxidant stream discharged from the reactor. Further, it should be noted that the concentration of solids in the oxidant is increased eightfold over the solids concentration in the reactor discharge. Significantly, the particle size distribution of the regenerated oxidant is markedly readjusted by the process to reduce the quantity of very small particles (less than 325 mesh), in the reactor oxidant charge. A 100 percent increase is noted in the size of particles greater than 325 mesh.

EXAMPLE II

A white liquor stream containing sulfides is admixed with manganese oxidant according to the procedure of Example I with the exception of the following parameters:

| | |
|---|---|
| 1. Reactor | |
| Sulfidity, % | 20 |
| Temperature °F. | 210 |
| Residence Time, min. | 15 |
| 2. Reactor Discharge Stream | |
| Solids, concentration %, by wt. | 4 |
| Flocculant employed | causticized starch |
| Dosage Level flocculant, ppm | 1000 |
| MnO$_2$ in Stream, % by weight as calculated by the direct oxalate method | 20 |
| 3. Thickener Clarifier | |
| Solids in underflow %, wt. | 30 |
| Solids in overflow, ppm | 20 |
| 4. Vacuum Filter-Extractor | |
| Solids in filter cake formed, % wt. | 60 |
| 5. Solids Mixer | |
| Solids in charge produced, % wt. | 80 |
| 6. Tunnel Dryer | |
| Gas Temperature, °F. | 150 |
| Oxygen in gas, % vol. | 70 |

The oxidant charge produced contains 30 percent by weight manganese dioxide by oxalate analysis and the solids content of the charge is 90 percent by weight.

EXAMPLE III

A white liquor stream containing sulfide is admixed with manganese oxidant according to Example I with the exception that the following parameters are employed and that the thickened slurry discharged from the thickener-clarifier is introduced into the solids mixers with added dry oxidant, thus eliminating the use of the vacuum filter:

| | |
|---|---|
| 1. Reactor | |
| Sulfidity, % | 90 |
| Temperature °F. | 105 |
| Residence Time, hrs. | 3 |
| 2. Reactor Discharge Stream | |

| | |
|---|---|
| Solids, wt. % | 40 |
| Flocculant employed | sodium polystyrene sulfonate |
| MnO₂ in Stream, % by weight as calculated by the direct oxalate method | 5 |
| 3. Thickener-Clarifier | |
| Solids in underflow, wt. % | 50 |
| Solids in overflow, ppm | 200 |
| 4. Solids Mixer | |
| Solids in charge, % wt. | 75 |
| 5. Tunnel Dryer | |
| Gas temperature, °F. | 1000 |

The oxidized charge produced, contains 42 percent by weight manganese dioxide as analyzed and the solids content of the charge is 99 percent by weight.

Examples II and III illustrate the capabilities of the process and apparatus of the invention as temperatures, flocculant, residence time, and apparatus are varied within process limits. Further combinations and embodiments will be obvious to those skilled in the art, such as centrifuging the product slurry and directing the slurry to the solids mixer and the like.

Wherefore I claim:

1. In a process employing manganese oxidant for oxidation purposes in a reactor including the steps of producing an aqueous product stream containing spent manganese oxidant, wherein a major portion of manganese is said spent oxidant is in lower oxidation states, producing a thickened aqueous slurry of spent manganese oxidant, air-oxidizing the spent oxidant to form a regenerated manganese oxidant wherein a major portion of the manganese in the regenerated oxidant is in higher oxidation states and reusing the regenerated oxidant for oxidation purposes, the improvement which comprises:
forming a charge of free-flowing granular particles from said slurry prior to oxidizing the slurry,
whereby the particles are reoxidized into a hardened particulate manganese oxidant charge wherein a major portion of said hardened particles are of a size greater than that passing through a number 325 mesh screen, thus reducing the tendency of said spent manganese oxidant to form into fines and lumpy aggregates during regeneration.

2. The process of claim 1 in which the solids content of the free-flowing particles at least are about 70 percent by weight.

3. In a process of oxidizing sulfide to polysulfide sulfur by reaction with manganese oxidant in a reactor associated with an alkaline pulping system including the steps of producing an aqueous product stream containing spent manganese oxidant wherein a major portion of said manganese in said spent oxidant is in lower oxidation states, forming a thickened aqueous slurry of spent oxidant, air-oxidizing the spent oxidant to a regenerated manganese oxidant charge wherein a major portion of said manganese in said regenerated charge is in higher oxidation states and reusing the regenerated oxidant for further oxidation of sulfide, the improvement which comprises:

a. introducing a flocculant selected from the group consisting of non-ionic and anionic flocculants stable in basic solution into the reactor product stream;
b. settling said flocculated stream to produce a thickened aqueous slurry of spent manganese oxidant solids and an effluent stream;
c. forming a charge of free-flowing particles from said slurry, said particles having a moisture content no greater than about 30 percent by weight based on the total weight of the particles;
d. heating said charge at from about 160° to 600° F. to reoxidize said charge such that the moisture content of the particles is reduced to less than about 10 percent by weight and the surface temperature of the particles reaches at least about 200° F., and
e. recycling said reoxidized charge to said reactor,
whereby the spent manganese oxidant is reoxidized to a hardened particulate charge, wherein a major portion of said hardened particles are of a size greater than that passing through a number 325 mesh screen, thus reducing the tendency of the regenerated oxidant to form into fines and lumpy aggregates during regeneration.

4. The process of claim 3 in which the slurry is concentrated to at least about 40 percent solids by weight, and thereafter, the slurry is combined with sufficient substantially dry manganese oxidant to form a free-flowing granular charge having a moisture content no greater than about 20 percent by weight of said charge.

5. The process of claim 3 and in addition the steps of vacuum filtering the thickened slurry to produce a filter cake having a solids content of at least about 60 percent by weight manganese oxidant solids and combining the filter cake with substantially dry manganese oxidant to produce a charge of free-flowing granular particles having a moisture content no greater than about 20 percent by weight.

6. The process of claim 3 and the steps of partially drying the thickened slurry to a charge having a moisture content no greater than about 20 percent by weight and thereafter crushing the partially dried slurry to form a free-flowing granular charge suitable for oxidizing.

7. The process of claim 3 and including the step of filtering the effluent stream produced by the settling step to recover additional spent manganese oxidant.

8. The process of claim 3 in which the flocculant is a polyacrylamide having a molecular weight of from about 1 million to 6 million.

9. The process of claim 3 in which the flocculant is sodium polystyrene sulfonate.

10. The process of claim 3 in which the flocculant is a causticized starch.

11. The process of claim 3 including the step of passing said reoxidized charge through a crusher prior to said recycling to said reactor to reduce the quantity of particles retained on a 100 mesh screen.

* * * * *

UNITED STATES PATENT OFFICE
CERTIFICATE OF CORRECTION

Patent No. 3,653,824   Dated April 4, 1972

Inventor(s) Richard G. Barker et al.

It is certified that error appears in the above-identified patent and that said Letters Patent are hereby corrected as shown below:

Column 1, line 55, after "heretofore" insert -- produced for oxidation processes, especially for the kraft --. Column 7, line 25 after "analyzed" insert -- (see run 1 at tunnel dryer) --; line 26. "the" should read -- The --; lines 28 and 29, cancel "(see run 1 at tunnel dryer)". Column 9, line 56, "of" should read -- for --.

Signed and sealed this 7th day of November 1972.

(SEAL)
Attest

EDWARD M. FLETCHER, JR.  
Attesting Officer

ROBERT GOTTSCHALK  
Commissioner of Patents